(12) United States Patent
Kim

(10) Patent No.: US 6,704,417 B2
(45) Date of Patent: Mar. 9, 2004

(54) PERSONAL DIGITAL ASSISTANT/ TELEPHONE COMBINATION DEVICE

(75) Inventor: Young S. Kim, Los Altos, CA (US)

(73) Assignee: Samsung Electronics Co., Ltd. (KR)

( * ) Notice: Subject to any disclaimer, the term of this patent is extended or adjusted under 35 U.S.C. 154(b) by 383 days.

(21) Appl. No.: 09/755,376

(22) Filed: Jan. 4, 2001

(65) Prior Publication Data

US 2001/0046290 A1 Nov. 29, 2001

Related U.S. Application Data

(60) Provisional application No. 60/189,203, filed on Mar. 14, 2000.

(51) Int. Cl.$^7$ ................................................. H04M 1/00
(52) U.S. Cl. .............................. 379/433.07; 379/433.13
(58) Field of Search ....................... 379/433.07, 433.04, 379/368, 433.12, 433.13, 433.01; 455/90, 575

(56) References Cited

U.S. PATENT DOCUMENTS 5,646,649 A * 7/1997 Iwata et al. .................. 455/575

FOREIGN PATENT DOCUMENTS

JP 4-23547 * 1/1992 ............ 379/433.01

* cited by examiner

Primary Examiner—Jack Chiang
(74) Attorney, Agent, or Firm—Dilworth & Barrese LLP

(57) ABSTRACT

A personal digital assistant/telephone device comprising a base, a screen coupled to the base, and a keypad hingably mounted to the base. The keypad provides a partial view of the screen in a lowered position and a full view of the screen in a raised position. The keypad further comprises a window that provides a partial view of the screen when the keypad is in a lowered position. A cover hingably mounts to the base and the keypad is located between the cover and the base. The cover rotates between an open position and a closed position. The screen displays telephone information when the keypad is in a lowered position. Control buttons coupled to the base are covered when the cover is in the closed position and uncovered when the cover is in an open position. In an additional embodiment, control buttons coupled to the base are uncovered when the cover is in both the closed position and the open position.

8 Claims, 4 Drawing Sheets

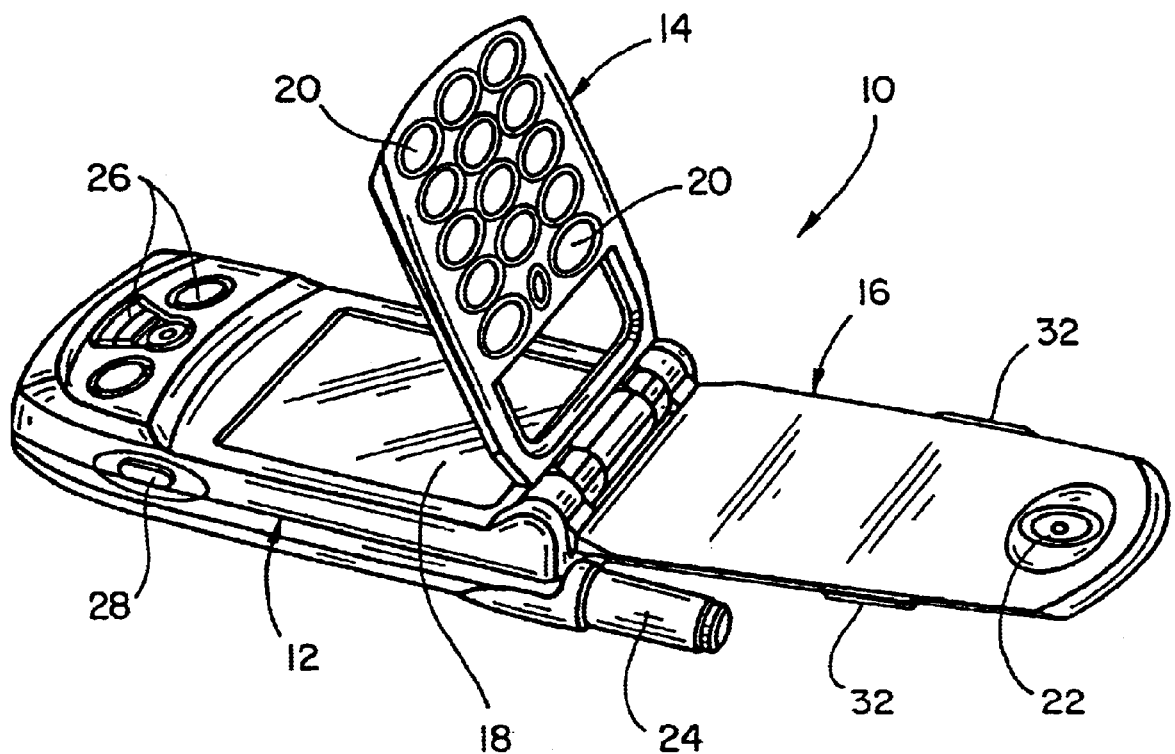
FIG_1
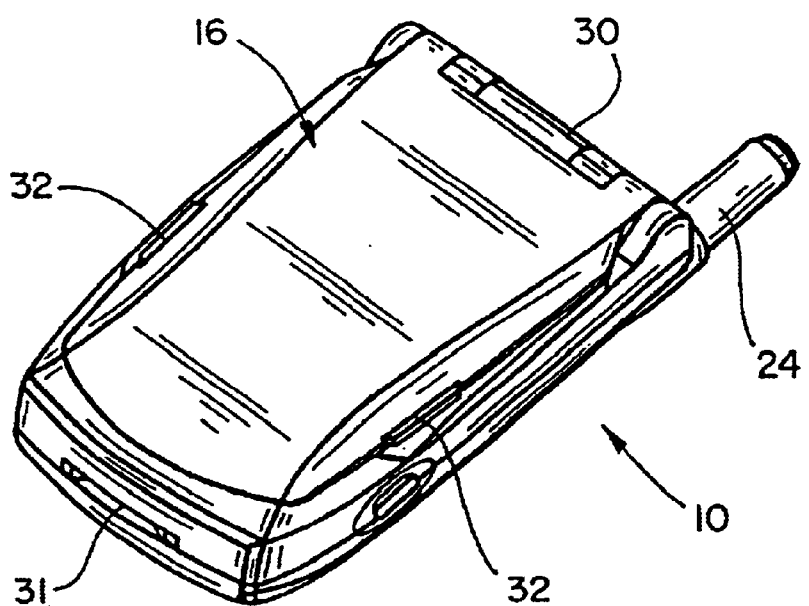
FIG_2

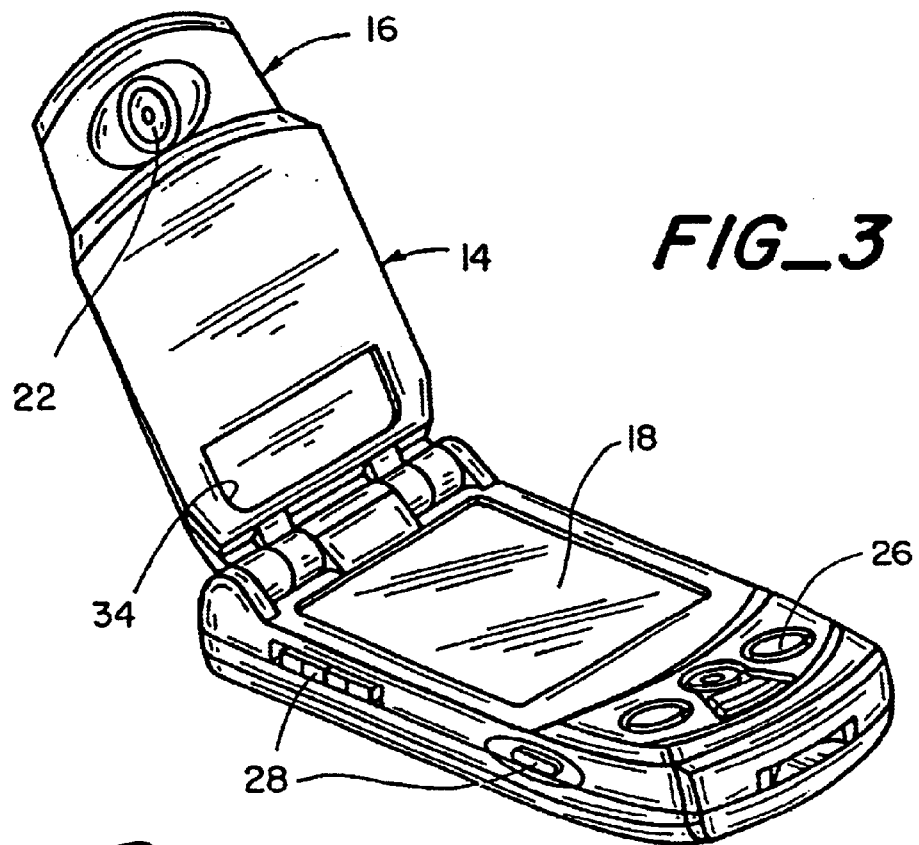
FIG_3
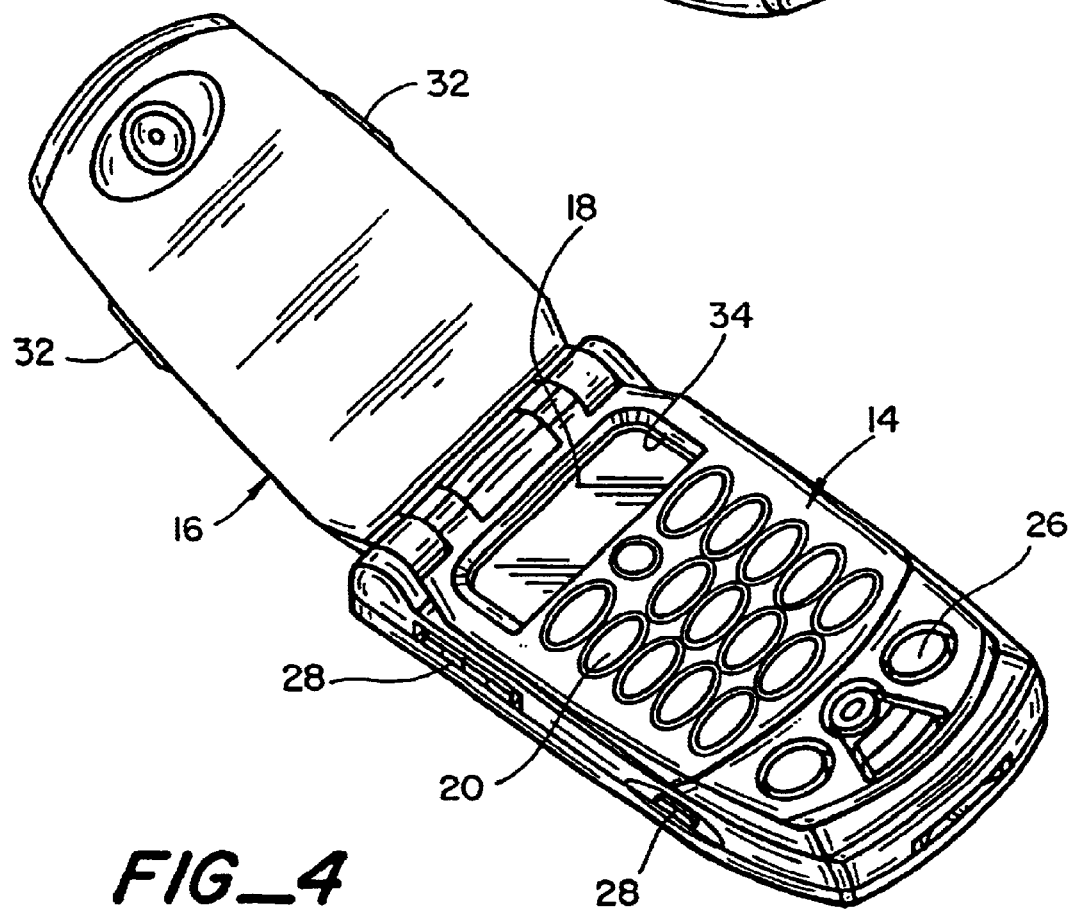
FIG_4

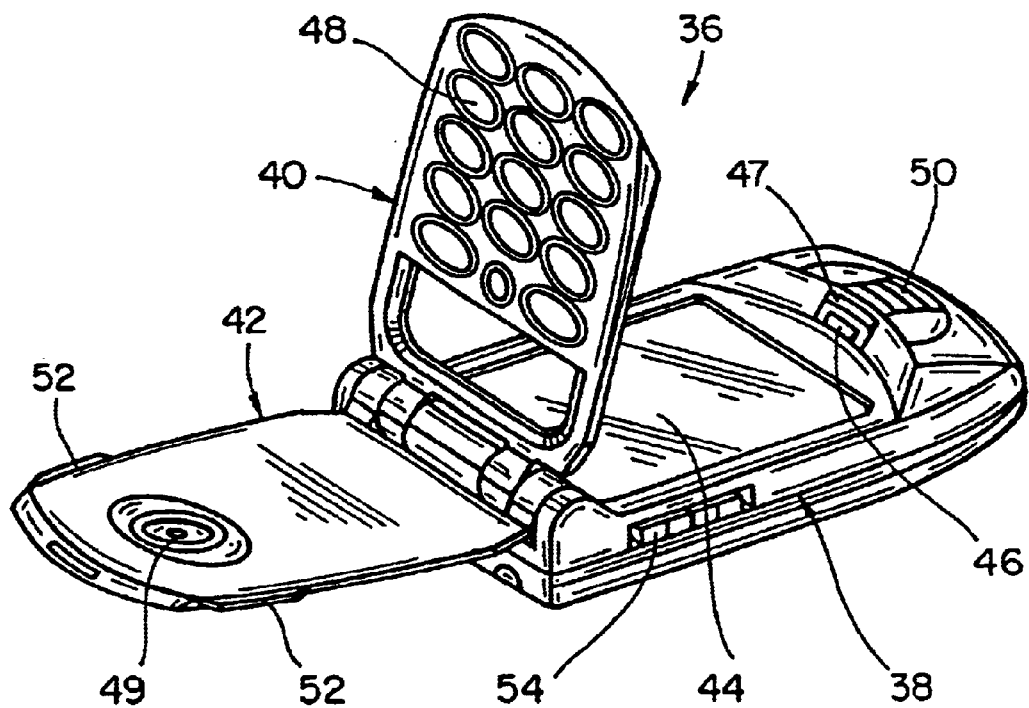
FIG_5
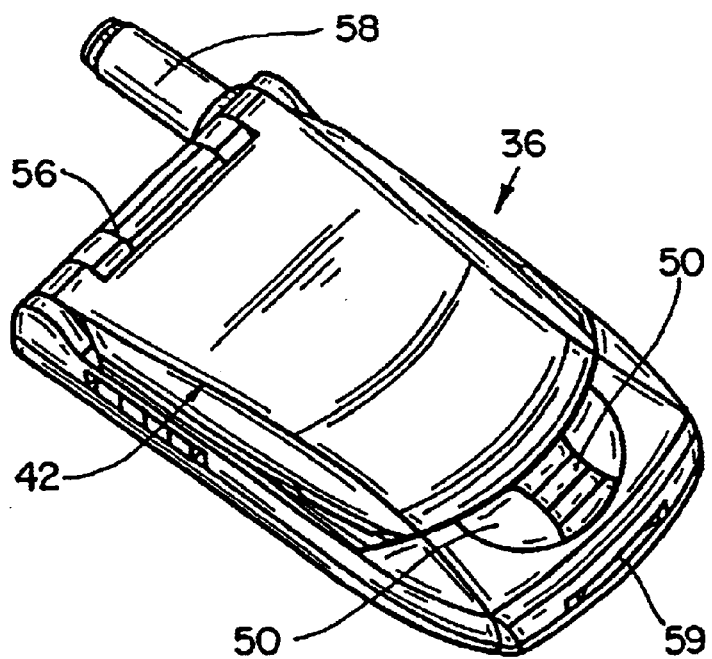
FIG_6

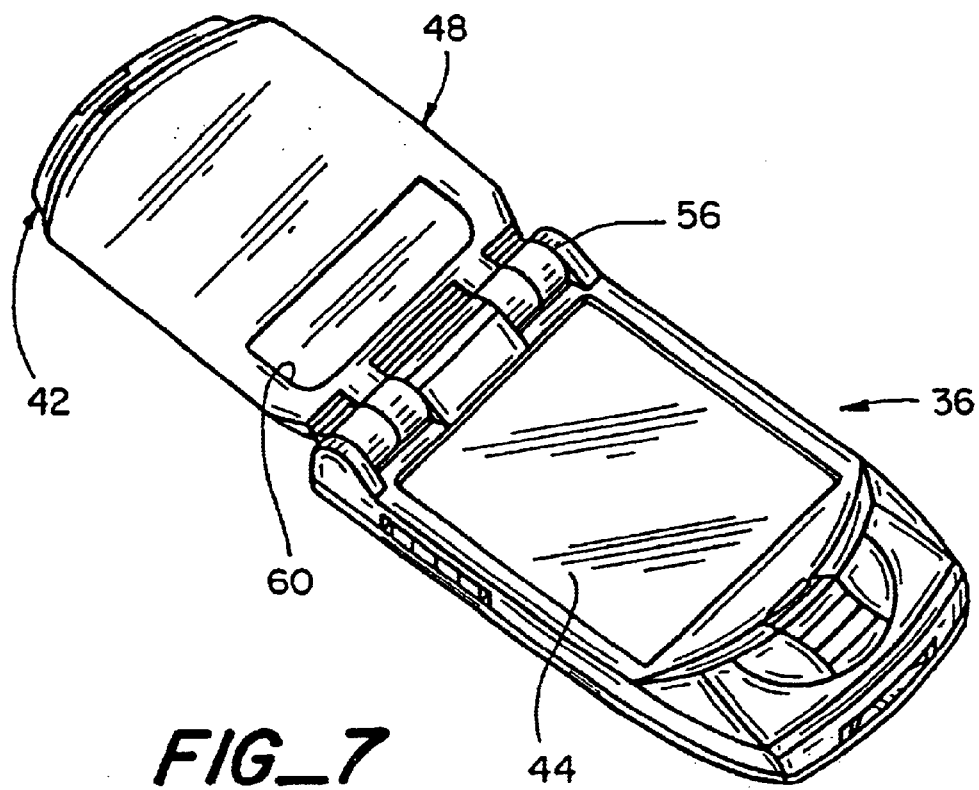
FIG_7
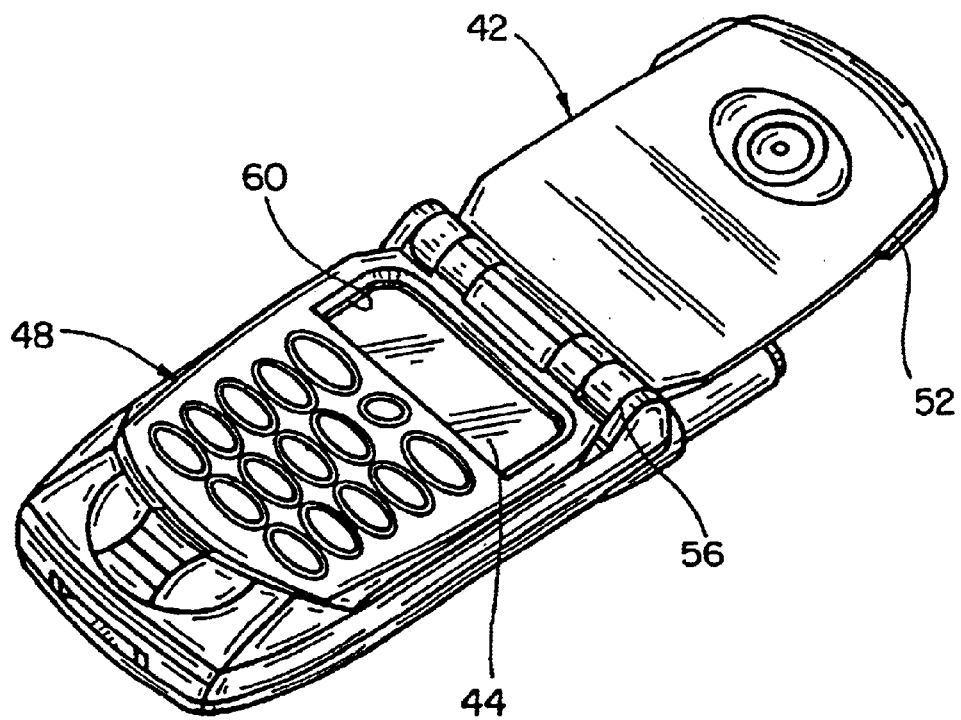
FIG_8

PERSONAL DIGITAL ASSISTANT/TELEPHONE COMBINATION DEVICE

RELATED APPLICATIONS

This application claims priority to provisional application Ser. No. 60/189,203 filed Mar. 14, 2000.

BRIED DESCRIPTION OF THE INVENTION

This invention relates generally to a personal digital assistant and telephone combination device.

BACKGROUND OF THE INVENTION

In today's mobile society an increasingly large number of individuals carry cellular telephones. A lesser number of individuals also carry personal digital assistants (PDAs) for scheduling, accessing the Internet, linking with computers, and maintaining contact information. Although cellular phones and PDAs are decreasing in size they are still bulky.

What is needed is a PDA/mobile phone combination that provides less bulk than the two separate devices and is easy to use.

OBJECTS AND SUMMARY OF THE INVENTION

It is a general object of the present invention to provide a portable device which incorporates cellular telephone capabilities and personal digital assistant capabilities.

The foregoing and other objects of the invention are achieved by a structure which includes a base which houses personal digital assistant electronics with an associated display screen, a telephone which includes a housing for some or all of the telephone-associated electronics hinged to the base so that, in one position, the telephone keypad is presented for operation with part of the PDA display exposed to act as a telephone display and, in a second position, the PDA display is exposed for operation as a personal digital assistant, and a cover is provided which, when closed, acts to protect the personal digital assistant and the telephone.

BRIEF DESCRIPTION OF THE DRAWINGS

The invention will be more fully understood from the following description when read in conjunction with the accompanying drawings, wherein:

FIG. 1 is a perspective view of a first embodiment of the personal digital assistant/telephone device with the telephone keypad raised to expose the personal digital assistant display and controls.

FIG. 2 is a perspective view of the device shown in FIG. 1 with the cover in a closed position.

FIG. 3 is a perspective view of the device shown in FIG. 1 with the keypad raised so that it is flush with the cover.

FIG. 4 is a perspective view of the device shown in FIG. 1 with the keypad lowered so that it is flush with the base.

FIG. 5 is a perspective view of a second embodiment of the personal digital assistant/telephone device with the keypad raised to expose the personal digital assistant display.

FIG. 6 is a perspective view of the device shown in FIG. 5 with the cover in a closed position.

FIG. 7 is a perspective view of the device shown in FIG. 5 with the keypad raised so that it is flush with the cover.

FIG. 8 is a perspective view of the device shown in FIG. 5 with the keypad lowered so that it is flush with the base.

DESCRIPTION OF THE PREFERRED EMBODIMENT

FIG. 1 shows a first embodiment of the personal digital assistant (PDA)/telephone device 10. Device 10 includes a base 12 with a keypad 14 and a cover 16 hingably mounted to one end of base 12. Telephone keypad 14 hingably mounts between base 12 and cover 16, covering display 18 when lowered and exposing display 18 when raised. Device 10 includes a stencil (not shown) for contacting display 18. Display 18 is preferably a touch-sensitive display, while keypad 14 is of the type conventionally used in cellular telephones In one embodiment keypad 14 has a lock that secures it to base 12. In another embodiment keypad 14 freely rotates. Keypad 14 has buttons 20 for operating device 10 as a telephone. Cover 16 includes speaker 22, which a user may place against their ear in order to hear a conversation. Antenna 24 provides wireless radio transmission and reception for device 10. Operational buttons 26 mount to base 12 and are used for phone and PDA functions. Wings 32 along either side of cover 16 assist in raising and lowering. Function buttons 28 are on either side of device 10. A battery (not shown) is carried by either cover 32 or base 12.

FIG. 2 shows device 10 with cover 16 in a closed position. In the closed position cover 16 protects operational buttons 26. In one embodiment cover 16 has a latch that keeps it closed, while in another embodiment hinge 30 biases cover 16 in an open or closed position. A microphone 31 is disposed along the bottom of base 12.

FIG. 3 shows cover 16 and keypad 14 in a raised position. This position is desirable for device 10 to operate as a PDA, with screen 18 fully exposed. In an alternate embodiment, device 10 functions as a phone with keypad 14 in raised position by transmitting information from memory (not shown) stored in device 10 to a recipient device using wireless communication.

FIG. 4 shows cover 16 in a raised position while keypad 14 is in a lowered position. An electrical connection through, for example, hinge 30 supports communication and power between keypad 14 and base 12. Device 10 functions primarily as a phone when keypad 14 is in a lowered position. Information relevant to a phone call is displayed on the viewable portion of display 18 when keypad 14 is in a lowered position. Thus, in this position, device 10 is operated as a conventional cellular telephone, including the display of information, etc.

FIG. 5 shows a second embodiment of the present invention. Device 36 includes a base 38 with a keypad 40 and a cover 42 hingably mounted to one end of base 38. Keypad 42 hingably mounts between base 38 and cover 42, covering display 44 when lowered and exposing display 44 when raised. Display 44 is preferably touch-sensitive.

Base 38 has a clasp 46 that secures keypad 40 to base 38. A clasp 47 also secures cover 42 to base 38. Keypad 40 has buttons 48 for operating apparatus 36 as a telephone. Cover 42 includes speaker 44, which a user may place against their ear in order to hear a conversation. Operational buttons 50 mount to base 38 and are used for phone and PDA functions. Wings 52 along either side of cover 42 assist in raising and lowering cover 42. Function buttons 54 are on either side of apparatus 10. A battery (not shown) is in either cover 42 or base 38.

FIG. 6 shows device 36 with cover 42 in a closed position. One aspect of the present invention is accessibility to operational buttons 50 while cover 42 is in a closed position.

In another embodiment hinge 56 biases cover 42 in an open or closed position. Antenna 58 provides wireless radio transmission and reception for apparatus 36. A microphone 59 is disposed along the bottom of base 38.

FIG. 7 shows cover 42 and keypad 48 in a raised position. This position is desirable for apparatus 36 to operate as a PDA, with screen 44 fully exposed. In an alternate embodiment, device 36 functions as a phone with keypad 48 in raised position by transmitting information from memory (not shown) stored in device 36 to a recipient device using wireless communication.

FIG. 8 shows cover 42 in a raised position while keypad 48 is in a lowered position. An electrical connection through, for example, hinge 30 supports communication and power between keypad 48 and base 38. Device 36 functions primarily as a phone when keypad 48 is in a lowered position. Information relevant to a phone call is displayed through a window 60 on the viewable portion of display 44 when keypad 48 is in a lowered position. Thus, in this position, the device 36 is operated as a conventional cellular telephone, including the display of information, etc.

Thus, there has been provided a compact, versatile cellular telephone/personal digital assistant combination which is easily transported and used by mobile individuals.

What is claimed is:

1. A personal digital assistant/telephone device comprising:
    a base having first and second edges on opposite ends thereof;
    a screen coupled to the base;
    a cover hingably mounted to and rotatable about the first edge of the base, wherein the cover is opened away from the base;
    a speaker positioned on an inner surface of the cover;
    a keypad hingably mounted to and rotatable about the first edge of the base, and located between the cover and the base; and
    a window in the keypad, wherein when the cover is opened a partial view of the screen is provided when the keypad is in a lowered position adjacent to the base and a full view of the screen is provided when the keypad is in a raised position adjacent to the cover;
    wherein the keypad is operable to enable the device to function as a telephone when the keypad is in the lowered position and also to function as a telephone when the keypad is in the raised position.

2. The device of claim 1, wherein the screen displays telephone information when the keypad is in the lowered position.

3. The device of claim 1, wherein the screen displays PDA information when the keypad is in the raised position.

4. The device of claim 1, further comprising control buttons coupled to the base such that the control buttons are covered when the cover is closed and uncovered when the cover is opened.

5. The device of claim 1, further comprising control buttons coupled to the base such that the control buttons are uncovered when the cover is closed or opened.

6. The device of claim 1, further comprising a hinge providing an electrical connection between the base, the cover and the keypad.

7. The device of claim 1, further comprising a clasp for securing the keypad to the base.

8. A foldable mobile terminal comprising:
    a base having first and second edges on opposite ends thereof;
    a screen coupled to the base;
    a cover hingably mounted to and rotatable about the first edge of the base, wherein the cover is opened away from the base;
    a speaker positioned on an inner surface of the cover;
    a keypad hingably mounted to and rotatable about the first edge of the base, and located between the cover and the base; and
    a window in the keypad, wherein when the cover is opened a partial view of the screen is provided when the keypad is in a lowered position adjacent to the base and a full view of the screen is provided when the keypad is in a raised position adjacent to the cover,
    wherein the keypad is operable to enable the device to function as a telephone when the keypad is in the lowered position and also to function as a telephone when the keypad is in the raised position.

* * * * *